US008646612B2

(12) United States Patent
Kim et al.

(10) Patent No.: US 8,646,612 B2
(45) Date of Patent: Feb. 11, 2014

(54) METHOD OF FORMING METAL OXIDE NANO-POWDERS

(75) Inventors: Woohong Kim, Lorton, VA (US); Guillermo R. Villalobos, Springfield, VA (US); Jasbinder S. Sanghera, Ashburn, VA (US); Ishwar D. Aggarwal, Charlotte, NC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/423,987

(22) Filed: Mar. 19, 2012

(65) Prior Publication Data

US 2013/0243679 A1 Sep. 19, 2013

(51) Int. Cl.
B03B 7/00 (2006.01)
(52) U.S. Cl.
USPC ......... 209/12.1; 423/263; 209/44.1; 977/776; 516/88

(58) Field of Classification Search
USPC .......... 423/263; 516/775, 776, 33, 88, 89, 93; 977/33, 88, 89, 93, 775, 776; 209/12.1
See application file for complete search history.

(56) References Cited

U.S. PATENT DOCUMENTS

| | | | |
|---|---|---|---|
| 2008/0139944 A1* | 6/2008 | Weymer et al. | 600/459 |
| 2010/0160144 A1* | 6/2010 | Kim et al. | 501/152 |
| 2010/0261263 A1* | 10/2010 | Vo-Dinh et al. | 435/287.1 |

* cited by examiner

Primary Examiner — Stanley Silverman
Assistant Examiner — Richard M Rump
(74) Attorney, Agent, or Firm — US Naval Research Laboratory; Roy Roberts

(57) ABSTRACT

Monodisperse metal oxide nanopowders are prepared by treating a dispersion of crude metal oxide nanopowder with ultrasonication, allowing the dispersion to settle, and subjecting the remaining suspended portion to centrifugation to obtain a supernatant comprising metal oxide nanopowder.

6 Claims, 7 Drawing Sheets

METHOD OF FORMING METAL OXIDE NANO-POWDERS

BACKGROUND

Optically transparent ceramic materials have numerous applications such as in infrared sensors, transparent armor, and high power ceramic lasers. Mechanical and thermal shock resistant capabilities of ceramic materials are generally limited by their mechanical strength. It is generally accepted that the strength of a ceramic material is correlated to its grain size, with the strength of a ceramic inversely proportional to the final grain size. Thus, the strength of transparent ceramics can be largely improved simply by reducing their grain size. For example, the ballistic performance of oxide ceramics is known to be improved by the achievement of finer grain sizes in sintered products. Moreover, large grained materials tend to exhibit a lower mechanical strength than smaller grain-sized materials. Also, larger grained materials are less desirable in applications demanding high thermal shock resistance, such as high-energy laser systems that can generate significant heat loads. One way to improve the strength of ceramics is to develop ultrafine, preferably nanoscale, grain sizes. Nanosized starting powder thus offers the possibility of producing very fine grain sizes in transparent ceramic materials, thus providing higher mechanical strength and thermal shock resistance.

Various methods, including combustion synthesis, laser ablation, microwave plasma synthesis, precipitation from a solution, spray pyrolysis, and plasma arc synthesis have been reported to produce ceramic nano-powders. Although these methods are generally purported to provide high quality nano-powders, they have proved unsuccessful in producing un-agglomerated/un-aggregated nano-powders with mono-disperse and narrow sized distribution. For example, the flame spray pyrolysis is a well-known nano-powder production technique in which has been regarded as potentially producing non-agglomerated or weakly agglomerated nano-powder. However, in practice it tends to produce powders composed of mixture of broad size distribution in which the size of powders ranging from 10's of nanometers to few hundred microns. This results in larger grain sizes upon densification, e.g. when making ceramics. Another example of making nano-powder is by combustion synthesis method. It is known that nanosized powders are produced through the combustion of metal precursors and organic fuels such as citric acid and urea. This synthesis route is relatively cost effective and convenient. However, this method also suffers from drawback that the powders are composed of various sizes of particles of 100's of nanometer to a few hundreds of micron.

A need exists nano-scale metal oxide powders having a narrow size distribution.

BRIEF SUMMARY

In one embodiment, a method of preparing a metal oxide nanopowder comprises treating a crude metal oxide nanopowder dispersion with ultrasonication, allowing the dispersion to settle, thus obtaining a suspended portion, and centrifuging the suspended portion to obtain a supernatant comprising metal oxide nanopowder.

BRIEF DESCRIPTION OF THE DRAWINGS

FIG. 1 shows particle size distributions at various stages.

FIG. 2 shows particle size distributions in a $Yb^{3+}$ doped $Lu_2O_3$ powder synthesized by combustion synthesis.

DETAILED DESCRIPTION

Definitions

Figure 1A:
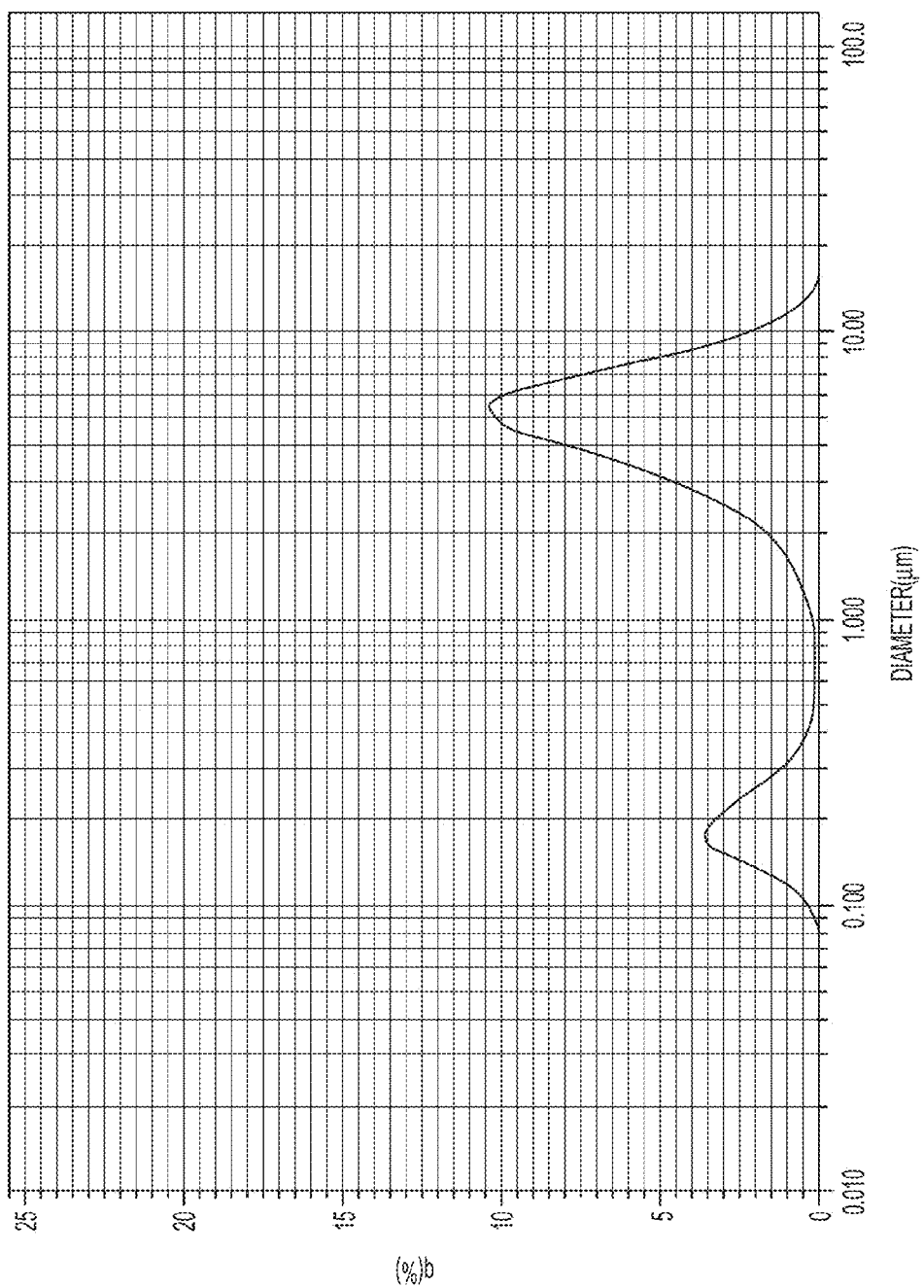
FIG. 1A shows particle size in the original $Yb^{3+}$ doped $Y_2O_3$ powder before separation processing.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a," "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term "crude" when used with regard to a metal oxide nanopowder means that the nanopowder is known or believed to lack a mono-dispersed particle size distribution.

As used herein, the term "doped" refers to the inclusion of amounts of rare-earth elements with a metal oxide.

Description

Described herein is a method for producing mono-dispersed and narrow size distributed nano-powders. Upon full densification, this nano-powder enables production of transparent ceramics with a uniform fin grain size, expected to result in materials having excellent mechanical strength and thermal shock resistance.

Undoped and rare-earth doped metal oxide powders can be synthesized or purchased from commercial suppliers. When such nanopowders were examined, they were found to have broad or multi-mode grain size distribution ranging from tens of nanometers to few hundreds microns. Particle size may be measured using a laser diffraction particle size analyzer.

To obtain the desired nanopowder, the starting, "crude" powder can be dispersed in liquid medium in a suitable container such as a beaker. The liquid medium can comprise organic and/or inorganic liquids such as alcohols, ketones, and water, and combinations thereof. The density of the liquid may be selected (for example by mixing various source liquids) in order to maximize the efficiency of the separation process.

The crude metal oxide nanopowder dispersion undergoes a sonication process by subjecting it to ultrasonic energy, preferable using high power probe sonicator. This serves to break up agglomerated particles. Optionally, a surfactant is added to the dispersion to effectively separate the particles. To reduce or eliminate the possibility of contamination from the material making up the sonicator itself (via pitting and/or erosion of the probe, typically resulting in contamination of the nanopowder with one or more metals such as Ti and/or alloys), the probe is preferably protected by a polymeric material. In one embodiment, during sonication process the probe is immersed into a thin plastic or latex bag containing water, and the bag containing the probe is used to sonicate the dispersion. This protects the sonication bath from contamination via the probe. It also provides similar sonicating power, since the thickness of the latex is preferably very thin.

After ultrasonication, the dispersion is allowed to settle for a time. The dispersion becomes separated into two portions, i.e., heavier/larger particles accumulate at the bottom of the beaker and finer particles remain dispersed in the liquid. Then, the top portion of the liquid dispersion is transferred into vessels suitable for centrifugation (e.g., centrifuge bottles) and centrifuged for period of time. Upon centrifugation, the finer particles are further separated into two distinct particle sizes. The milky-like dispersion in the supernatant has particle sizes of less than 100 nm with very narrow size distribution while the particles collected at the bottom of the centrifuge bottle is in the rage of microns. The nano-powders of the milky-like dispersion is collected and dried. This technique, dramatically simplifies the process of manufacturing pure nano-powder with mono-dispersed size distribution.

Example 1

Figure 1B:
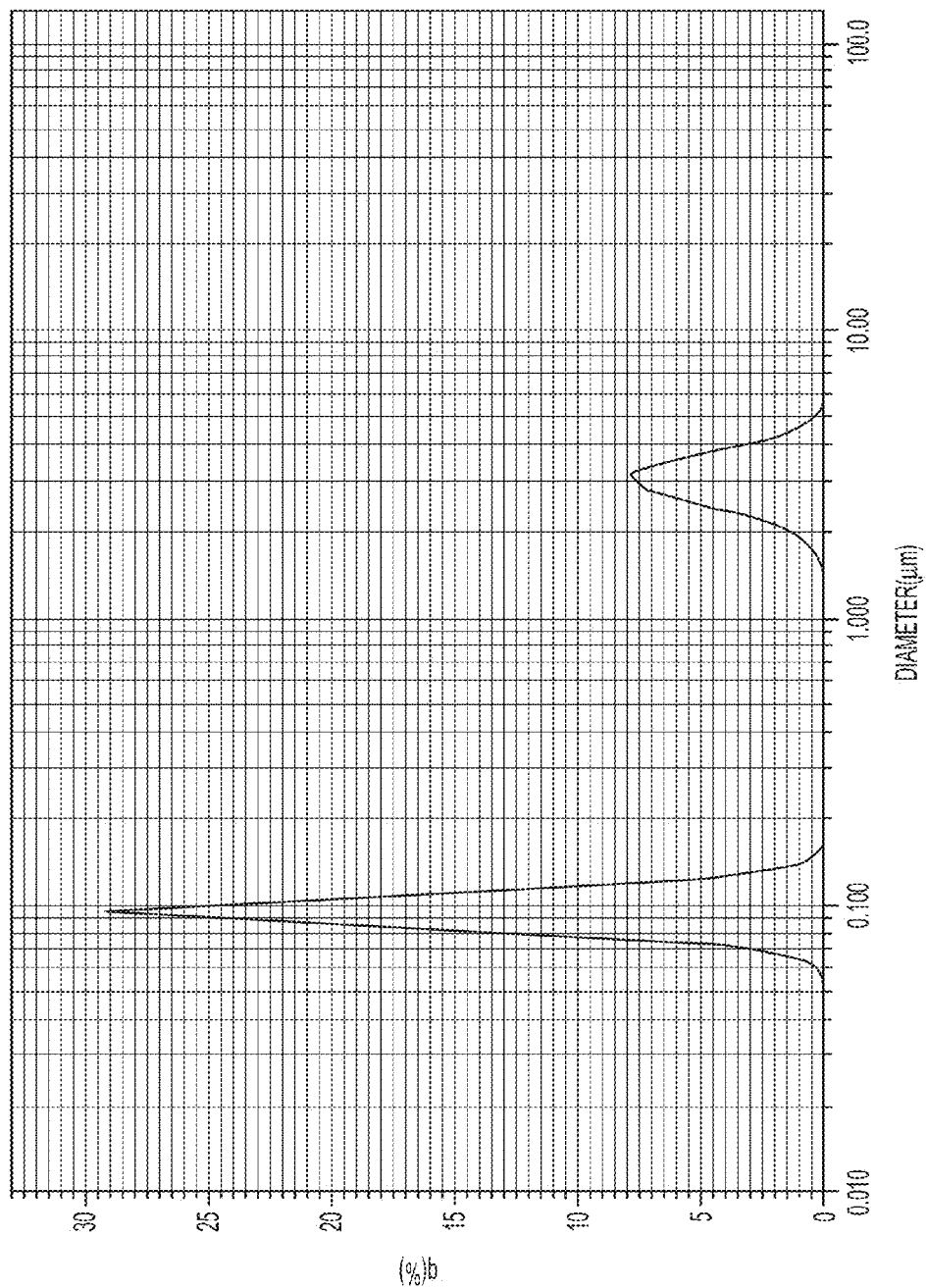
FIG. 1B shows results after sonication.
Figure 1C:
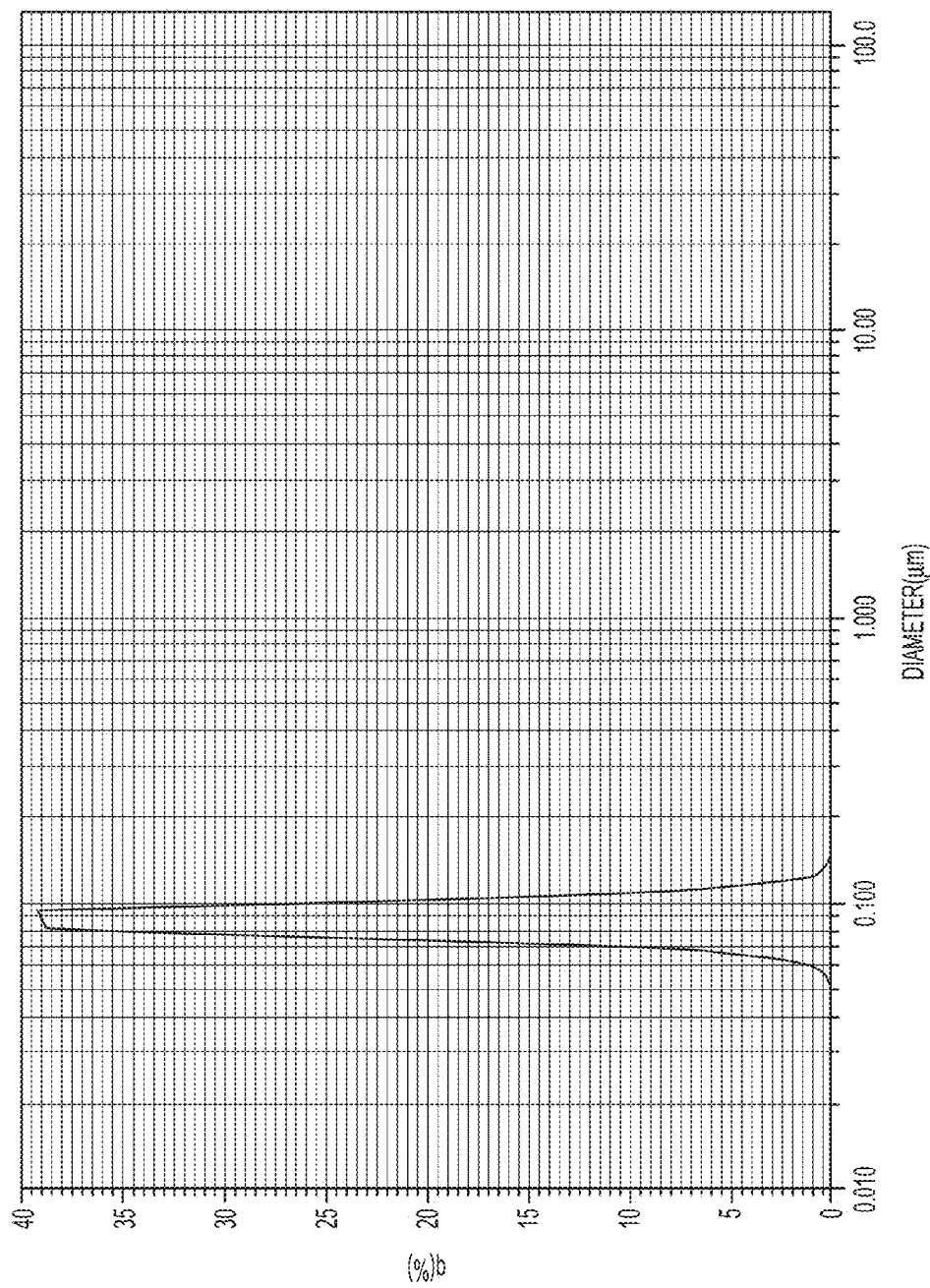
FIG. 1C shows the results on final nano-powder obtained after centrifugation and particle separation.

Powders of undoped and $Yb^{3+}$ doped $Y_2O_3$ synthesized by Flame Spray Pyrolysis were purchased from Nanocerox Inc. (Ann Arbor, Mich.). Powder (~50 g) was dispersed in distilled $H_2O$ in a 2 liter-beaker and particle size was measured using a laser scattering particle size distribution analyzer (HORIBA, LA-950). In some cases, a few drops of surfactant were added to disperse the powder more uniformly. FIG. 1A shows the particle size distribution of the initial "crude" 2% $Yb^{3+}$ doped $Y_2O_3$ powder before processing. It shows a broad and bimodal size distribution in which the mean size is about five microns. The dispersion underwent sonication process using high power probe sonicator (Sonics and Materials Inc., Vibra Cell VSC 600). The probe was immersed in a thin latex bag containing water during sonication process. Then, the dispersion was sit for a period (typically about one to two hours) until heavier and larger particles settled down at the bottom of the beaker. The lighter/finer particles in the dispersion were collected in a separate beaker and the particle size was measured. FIG. 1B shows the particle size of the finer particles collected after sonication. It contained ~50% of nano-powder with a mean size ~100 nm and ~50% of few micron size powders. This dispersion was then centrifuged at high speed greater than 3000 RPM for 30 minutes in a (Fisher, CL-40 centrifuge). Upon centrifugation, the dispersion was further separated into two portions, i.e., larger particles sedimented faster at the bottom of centrifuge bottle and finer particles still dispersed in the liquid. The particle size of the finer particles was measured. FIG. 1C shows the particle size of the pure nano-particles collected from liquid dispersion portion of the centrifuge bottle. The mean particle sizes of the nano-powder was measured to be ~80 nm and showed a mono-dispersed and narrow size distribution. Moreover, the mono-dispersed nanopowders obtained by the method described in this invention showed no noticeable contamination unlike a prior art method where as much as 170 ppm of Ti was detected from the powder caused by the pit or erosion of the Ti probe.

Example 2

Powders of undoped and $Yb^{3+}$ doped $Lu_2O_3$ synthesized by Flame Spray Pyrolysis were purchased from Nanocerox Inc. (Ann Arbor, Mich.). A separation process similar to that described in Example 1 was carried out. After the separation process, the mean particle size of the spinel nano-powder was measured to be about 100 nm and showed a mono-dispersed and narrow size distribution.

Example 3

Nano-powders of $MgAl_2O_4$ spinel synthesized by flame spray pyrolysis were purchased from Nanocerox Inc. (Ann Arbor, Mich.). A separation process similar to that described in Example 1 was carried out. After the separation process, the mean particle sizes of the spinel nano-powder was measured to be about 100 nm with a mono-dispersed and narrow size distribution.

Example 4

Powder of 10% $Yb^{3+}$ doped $Lu_2O_3$ was synthesized by combustion synthesis. First, suitable amounts of lutetium nitrate hydrate, ytterbium nitrate hydrate, and citric acid were dissolved in distilled $H_2O$. The solution was filtered through a 0.45 micron membrane filter. The solution was then slowly heated to 110° C. to remove excess water. The temperature was gradually increased to 150° C., and held until the solution turned very viscous. The viscous solution was transferred to alumina crucible and heated up to 450° C. in a box furnace. Spontaneous ignition and combustion reaction occurred in a short period of time. The foamy powder was calcined at 600° C. for 12 hours.

Example 5

Figure 2A:
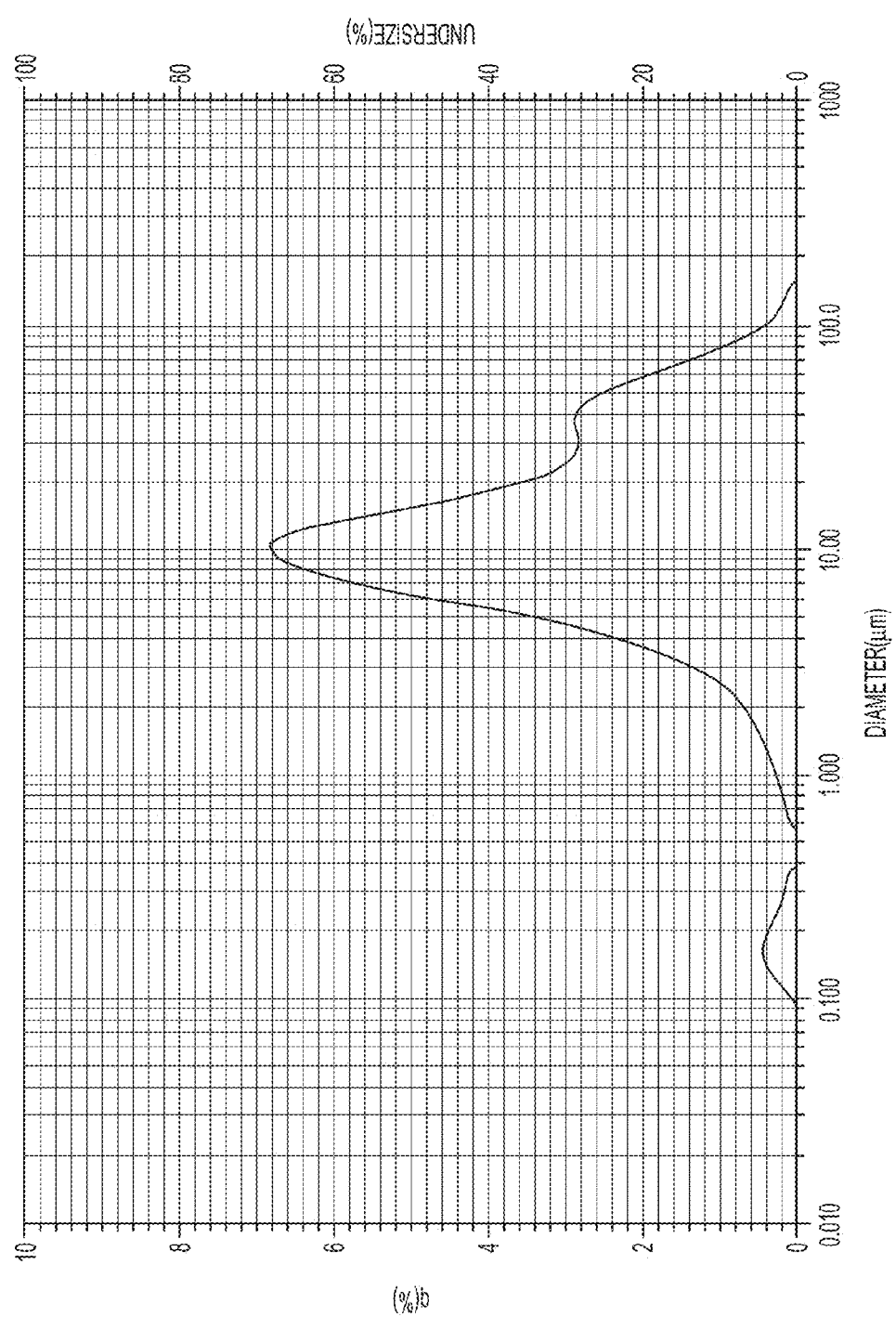
FIG. 2A is the particle size of the material before separation processing and FIG. 2B shows results on the final nano-powder obtained after centrifugation.
Figure 2B:
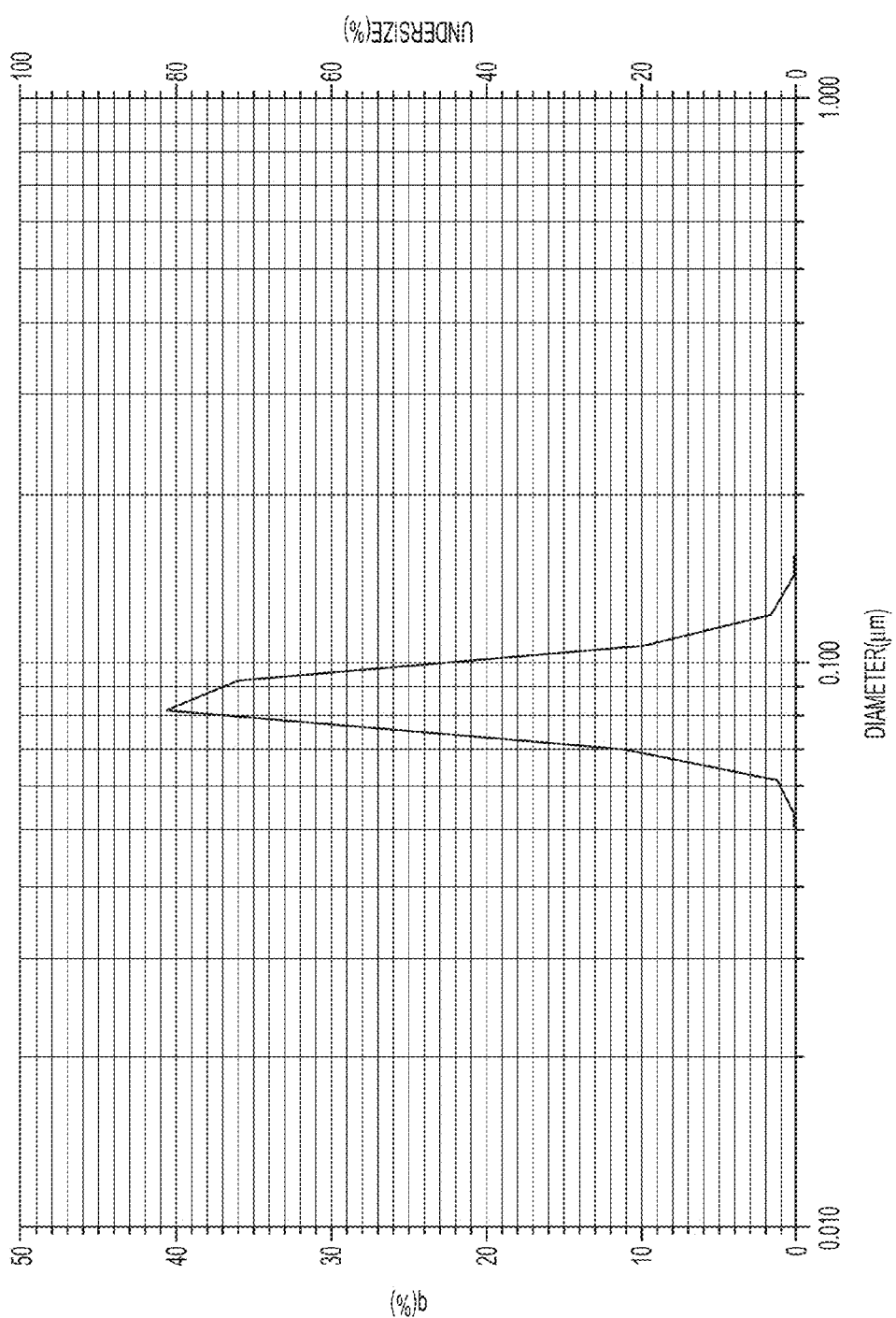

A separation process similar to that described in Example 1 was carried out using the powder synthesized by combustion synthesis method as described in Example 4. FIG. 2A shows the particle size distribution of the pristine $Yb^{3+}$ doped $Lu_2O_3$ powder before processing. It shows a broad and bimodal size distribution in which the mean size is about 5 microns. After the separation process using the method described in Example 1, the mean particle sizes of the $Yb^{3+}$ doped $Lu_2O_3$ nano-powder was measured to be about 80 nm and showed a very narrow size distribution. FIG. 2B shows the particle size distribution of the resulting nano-powder.

Example 6

Figure 3:
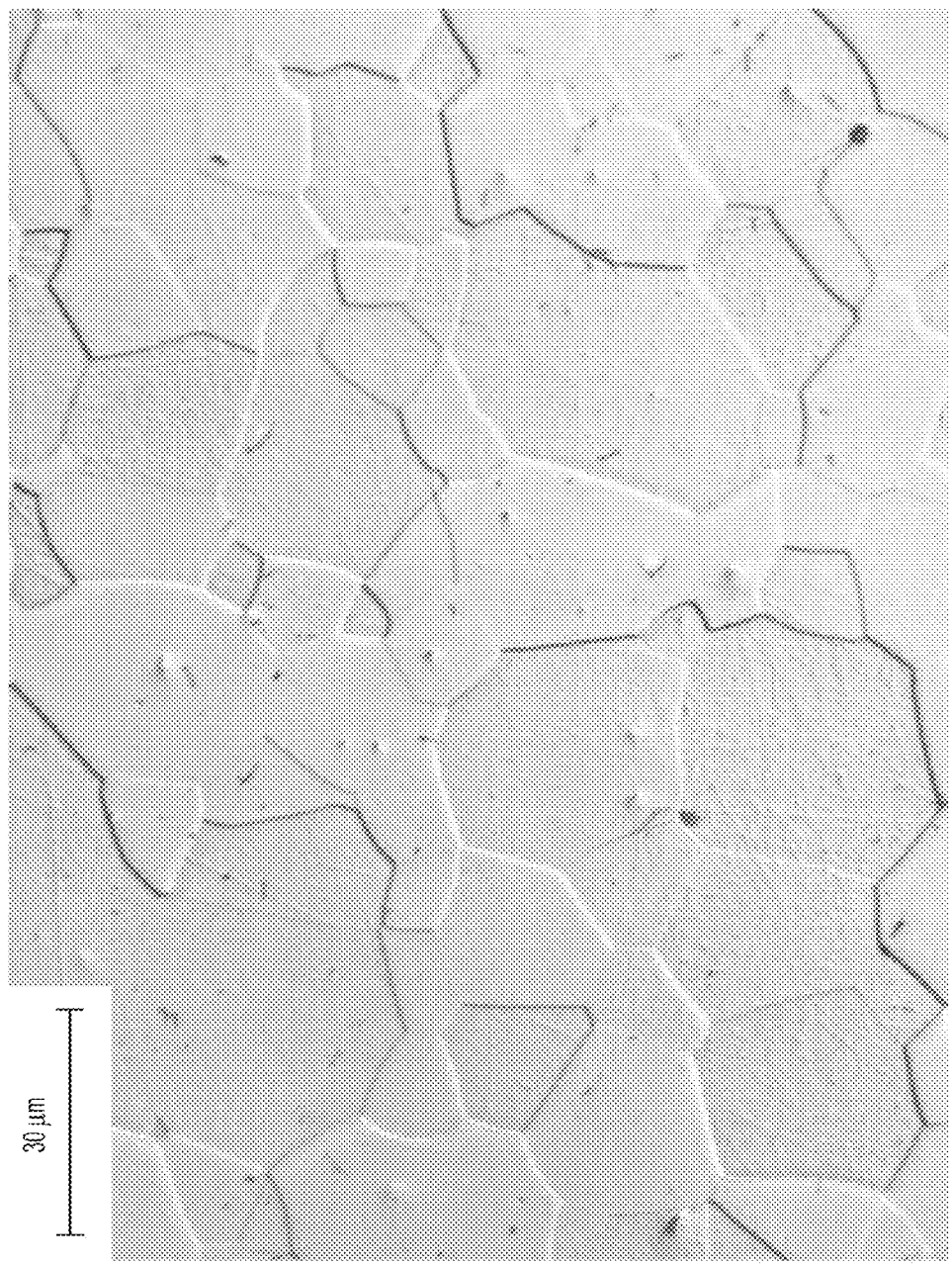
FIG. 3 is an optical micrograph of a ceramic hot pressed from starting $Yb^{3+}$ doped $Y_2O_3$ powder not subject to separation treatment.

As-received 2% $Yb^{3+}$ doped $Y_2O_3$ powder purchased from Nanocerox Inc. was hot pressed using following procedure. A sintering agent such as LiF was added in some cases to promote densification. The powder was placed in a grafoil-lined graphite hot press die. The die was placed in an argon/vacuum atmosphere hot press. Minimal pressure was applied until the powder started to densify at approximately 800° C. and was then stepped up to or above 3000 psi when a temperature at or above 1200° C. was attained. The heating schedule consisted, but was not limited to, of a 20° C./min ramp to 950° C., a 30 minute hold to allow the LiF to melt and clean/etch the particle surfaces, a 20° C./min ramp to 1200° C., a 30 minute hold to allow the now vaporized LiF to leave the hot press die, a 20° C./min ramp to 1600° C., and a 2 hour hold to fully densify the powder into a transparent shape. The heating elements were turned off to allow natural cooling of the hot press and hydraulic motor was turned off to allow the pressure to bleed off. Grain sizes were measured and they were in the range of about 30 to about 50 microns. FIG. 3 shows the optical microscope image of the hot pressed ceramic.

Example 7

Figure 4:
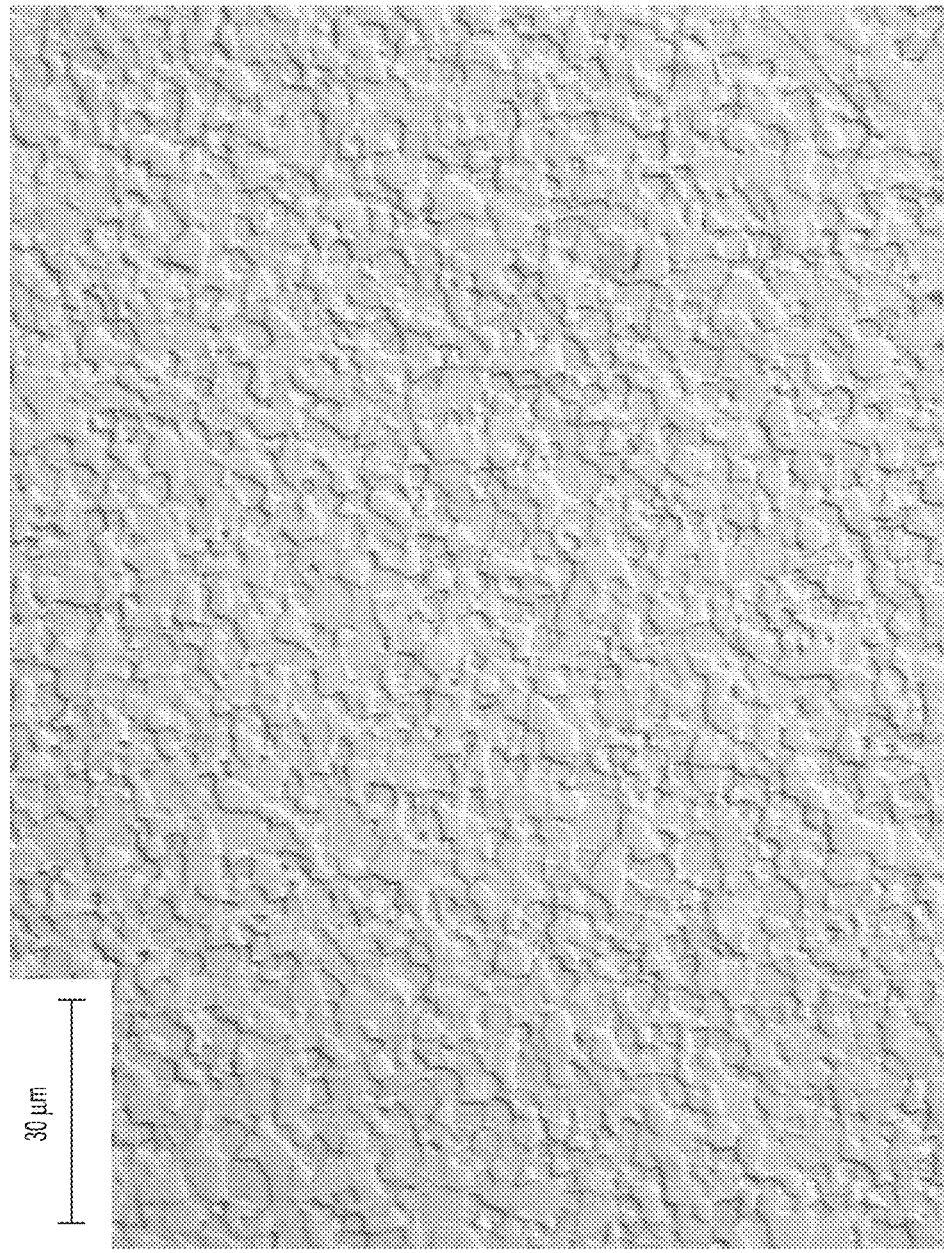
FIG. 4 is an optical micrograph of a ceramic hot pressed from mono-dispersed nano-powder prepared as described herein, with a mean size of 80 nm $Yb^{3+}$ doped $Y_2O_3$ powder.

Mono-dispersed 2% $Yb^{3+}$ doped $Y_2O_3$ powder nano-powder with a mean size of 80 nm collected by the method in Example 1 was hot pressed using procedure similar to that described in Example 6. Grain sizes were measured and they were in the range of about 1 to 2 microns. FIG. 4 shows the optical microscope picture of the hot pressed ceramic.

Concluding Remarks

The described methods provide a convenient way of separating the broad size distributed powders into distinct size distributed powders. They enable selective separation of nano-powders while avoiding contamination. Furthermore, the methods are typically environmentally safe since it can use water in most instances, and liquid can be collected and reused. The technology is expected to be applicable to most undoped and rare-earth metal oxide powders.

Each and every document mentioned throughout this text is hereby incorporated by reference in its entirety.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

1. C. R. Bickmore, K. F. Waldner, D. R. Treadwell, and R. M. Laine, "Ultrafine Spinel Powders by Flame Spray Pyrolysis of a Magnesium Aluminate Double Alkoxide" J. Am. Ceram. Soc., 79(5) 1419-1423 (1996).
2. C. Hwang, T. Wu, and J. Wan, "Design and modify the combustion synthesis method to synthesize ceramic oxide powders" J. Mat. Sci. 39 4687-4691(2004).
3. L. A. Chick, L. R. Pederson, G. D. Maupin, J. L. Bates, L. E. Thomas and G. J. Exarhos, "Glycine-nitrate combustion synthesis of oxide ceramic powders" Mat. Lett. 10 (1,2) 1990.

What is claimed is:

1. A method of preparing a metal oxide nanopowder, the method comprising:
   (a) treating a crude metal oxide nanopowder dispersion with ultrasonication using a plastic or latex bag containing an ultrasonication probe immersed in water,
   (b) allowing the dispersion to settle, thus obtaining a suspended portion, and
   (c) centrifuging the suspended portion to obtain a supernatant comprising metal oxide nanopowder.

2. The method of claim 1, wherein said metal oxide nanopowder is selected from the group consisting of $Y_2O_3$, $Sc_2O_3$, $Lu_2O_3$, $MgAl_2O_4$, YAG, LuAG, and doped variants thereof.

3. The method of claim 1, further comprising preparing crude metal oxide nanopowder by combustion synthesis.

4. The method of claim 1, wherein said dispersion includes a surfactant.

5. The method of claim 1, wherein said dispersion comprises a liquid medium selected from the group consisting of alcohols, ketones, water, and combinations thereof.

6. The method of claim 1, further comprising drying said supernatant comprising metal oxide nanopowder to obtain a dry metal oxide nanopowder.

* * * * *